Figure 1:
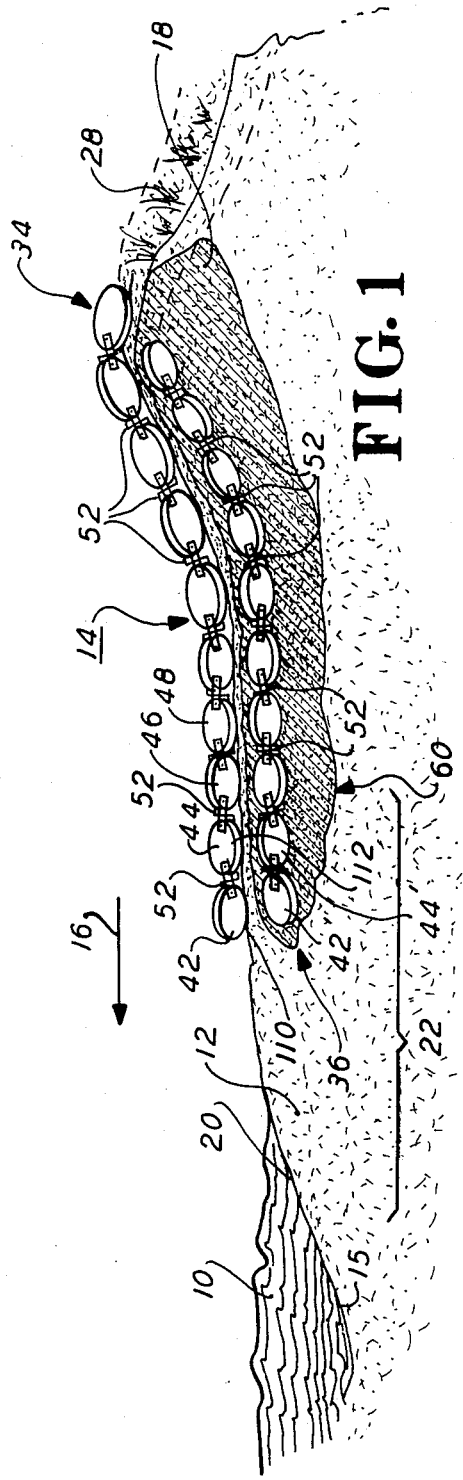

United States Patent [19]

Cacossa et al.

[11] Patent Number: 4,629,360
[45] Date of Patent: Dec. 16, 1986

[54] RETAINING WALL SYSTEM

[75] Inventors: Frank G. Cacossa; Kenneth F. Cacossa, both of Livingston, N.J.

[73] Assignee: Frank Cacossa Development Corporation, Livingston, N.J.

[21] Appl. No.: 734,767

[22] Filed: May 15, 1985

Related U.S. Application Data

[63] Continuation of Ser. No. 427,990, Sep. 29, 1982, abandoned.

[51] Int. Cl.$^4$ .......................... E02B 3/12; E02B 3/14; E02B 3/06
[52] U.S. Cl. ........................................ 405/16; 405/20; 405/35
[58] Field of Search .................................... 405/15–20, 405/21, 29–31, 33, 258, 284, 34, 35, 286; 46/26; 16/366, 367; 52/582; 256/12.5, 26

[56] References Cited

U.S. PATENT DOCUMENTS

| | | | |
|---|---|---|---|
| 809,137 | 1/1906 | Saling | 16/366 |
| 1,144,143 | 6/1915 | McGillivray | 405/20 |
| 2,008,866 | 7/1935 | Hoffard | 405/20 |
| 2,639,587 | 5/1953 | Hayden | 405/30 X |
| 3,252,287 | 5/1966 | Suzuki | 405/29 |
| 3,355,894 | 12/1967 | Vidal | 405/33 |
| 3,842,606 | 10/1974 | Skles et al. | 405/19 |
| 3,844,124 | 10/1974 | Tupper | 405/16 |
| 4,172,680 | 10/1979 | Brown | 405/16 |
| 4,297,052 | 10/1981 | Rankin | 405/16 |

FOREIGN PATENT DOCUMENTS

| | | | |
|---|---|---|---|
| 163283 | 3/1980 | Netherlands | 405/284 |
| 1328 | of 1866 | United Kingdom | 405/19 |
| 19284 | of 1896 | United Kingdom | 405/19 |

OTHER PUBLICATIONS

"Beach Prisms—A Shore Erosion Protection System Embodying an Artificial Beach Stabilizer", Peter R. Payne, Ocean Engng., vol. 7, pp. 327–345, 1980.

*Primary Examiner*—Cornelius J. Husar
*Assistant Examiner*—Nancy J. Stodola
*Attorney, Agent, or Firm*—Lerner, David, Littenberg, Krumholz & Mentlik

[57] ABSTRACT

Each disc of a plurality of strings of concrete discs is pinned at opposite edges to a connecting link, a link between adjacent discs to form a chain. Alternate discs in the string lie substantially in the same plane, adjacent discs lying in intersecting planes. The discs stand on edge to prevent substantial erosion of soil from one side of the string to the other.

31 Claims, 8 Drawing Figures

RETAINING WALL SYSTEM

This is a continuation of application Ser. No. 427,990 filed Sept. 29, 1982, now abandoned.

The present invention relates to soil erosion retaining walls.

Soil erosion retaining walls are widely used to minimize beach erosion during storms. Waves on ocean facing beaches during storms wash over sandy beach areas producing runoffs which carry substantial quantities of soil and sand away.

One solution to erosion is to erect sand dunes parallel to the shore line several feet in height and covered with grass. This is not always satisfactory as the roots of the grass are not sufficiently deep. Severe storms produce powerful waves which can sometimes undermine the roots and wash the dunes away. Another solution is to erect walls of mortared cement blocks. These are not entirely satisfactory, as erosion eventually tends to undermine the structure causing it to sag. Once it sags, it tends to fracture and break apart. Another solution is to pile many large rocks to form a retaining wall. The rocks tend to be individually washed away, or individually undermined so they sink. Once sunk, soil can be washed away over that rock. Further, automobile tires are also employed for this purpose. The tires may be randomly tied together with rope or chains. The tires tend to lay flat and are relatively ineffective.

According to the present invention in a retaining wall system for minimizing soil erosion a plurality of soil erosion inhibiting elements are included, each element comprising a body for interfering with the flow of water bearing eroded soil. A link device connects a first element to a second element. The link device includes a first means for pivotally securing the first element thereto for rotation about a first axis and second means for pivotally securing the second element thereto about a second axis nonparallel to the first axis.

IN THE DRAWING

Figure 2:
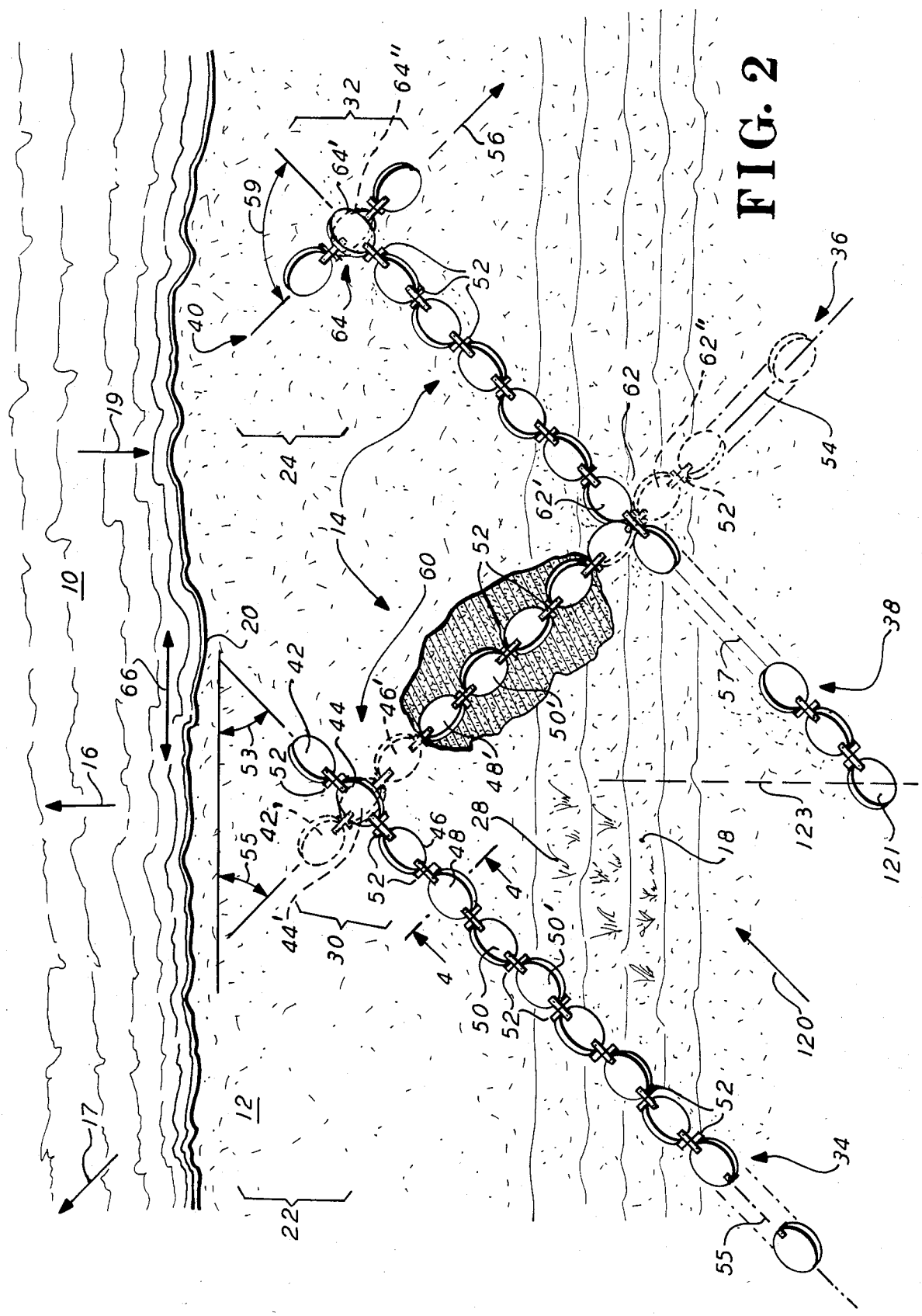
Figure 6:
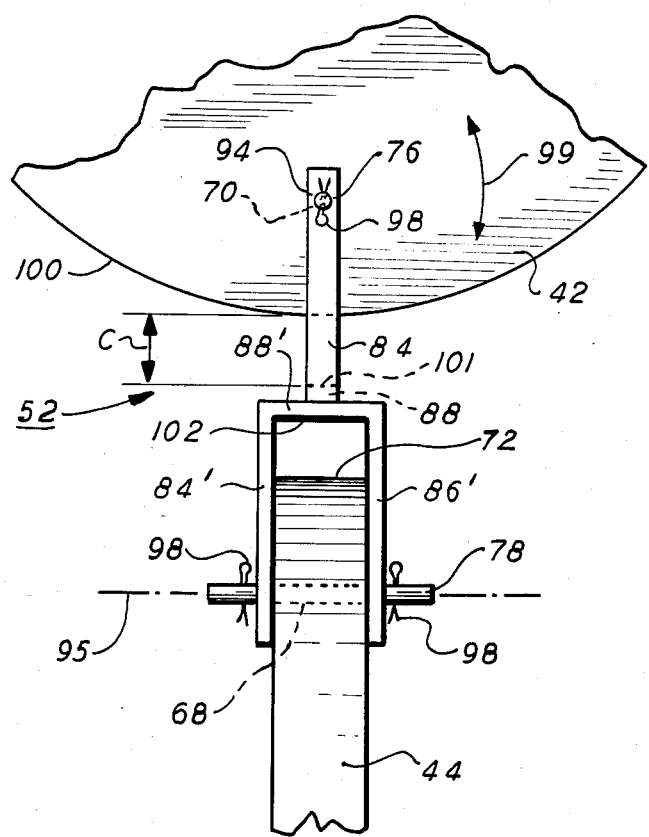
Figure 7:
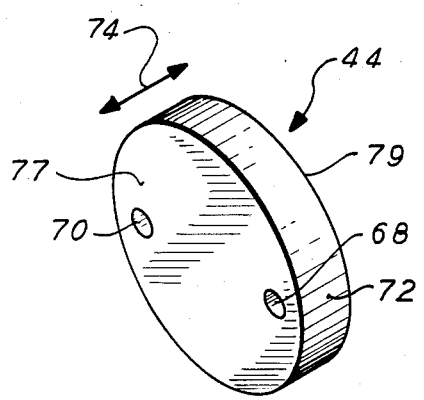
Figure 8:
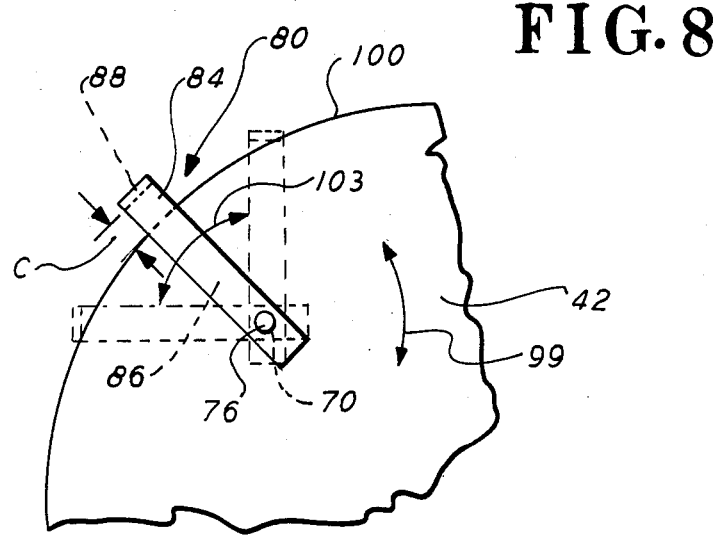

FIG. 1 is a side elevation view partially in section of an embodiment of the present invention, FIG. 2 is a plan view partially in section of the embodiment of FIG. 1, FIG. 3 is an isometric view of a connecting link used in the embodiment of FIGS. 1 and 2, FIG. 4 is an end sectional elevation view of the embodiment of FIG. 2 taken along lines 4-4, FIG. 5 is an end elevation view of the link of FIG. 3, FIG. 6 is an elevation view of the connecting portion of a link assembly employed in the embodiment of FIGS. 1 and 2, FIG. 7 is an isometric view of a soil retaining element used in the embodiment of FIGS. 1 and 2, and FIG. 8 is a fragmented side elevation view of a portion of the embodiment of FIG. 6 used to illustrate some of the principals of the present invention.

In FIGS. 1 and 2 a body of water 10 which, for example, may be an ocean, abuts a sand filled beach 12 at shore line 20. A retaining wall system 14 is deployed on beach 12 to minimize soil erosion into the ocean generally in direction 16. By way of example, direction 17 points to the northeast, which is assumed to be one direction from which major soil eroding storms originate. Such storms tend to create waves in the water 10 which wash over the beach 12 in direction 19. The waves are of such magnitude and force that they tend to erode away soil and sand from the beach in direction 16. The waves create after their dissipation on the beach a back flow of relatively strong currents in direction 16 which tend to carry the loosened sand and soil to the bottom 15 of the ocean under water 10. The waves and resulting backflow can cause significant erosion. This erosion is usually random and non-uniform. Thus one portion of the beach, for example at 22, can experience greater erosion than an adjacent portion, for example at 24, FIG. 2.

The wall system 14 is one which when set in place easily follows the contour of the terrain. For example, beach 12 includes a dune 18 which is a hill of sand or soil that is generally parallel to the shore line 20. The dune 18 comprises a pile of soil and sand generally in the range of four or more feet in height. The crest of the dune 18 is covered with grass 28. As shown in FIGS. 1 and 2, the wall system 14 overlies the beach 12 and the dune 18 and is constructed as will be described below to follow the uneven surface contour of the beach and dune 18 as the system is emplaced. Further the system 14 can readily sink at its end portions 30, 32 in response to erosion beneath those end portions. The portions 30 and 32 can sink without damage to the remaining portions of the system 14. This sinking is important because the flow of back-flow current generally in direction 16 tends to cause more significant erosion closest to the shore line 20. This is because portions 30, 32 usually being closest to line 20, receive the most frequent and harmful exposure to back-flow currents. All of this will become clearer below after the system 14 is explained in more detail.

In FIGS. 1 and 2, system 14 includes a plurality of similar strings 34, 36, 38, 40 of interconnected soil and sand retaining elements or bodies. The number of strings shown is by way of example, as in practice more or fewer strings may be employed depending on the extent of the area to be protected. The bodies in each string may comprise concrete discs such as discs 42, 44, 46, 48, 50 and so forth, in string 34. The discs are shown as a solid block of material. Other materials may be wood, metal, stone, for example. While the discs are shown solid, they may also be hollow such as automobile tires. In any case, the discs interfere with the back-flow of water bearing eroded soil. This interference causes eddy currents which permit the eroded soil in the back-flow water to settle. Thus an element which can interfere with such back-flow currents may be employed. What is important is that the element remain secured together as will be described and also present some measure of height above the soil surface to provide the desired flow interference. The discs described below achieve this aim.

The disc are interconnected by links 52. Each string comprises a series of discs similar to discs 42, 44, 46 and 48. A string such as string 34 may comprise as many discs as necessary for a given implementation. That is, the length of the string may include as many discs as necessary to provide desired coverage of a given beach area. By way of example, string 34 may be formed of twenty connected discs, although more or fewer may also be used. The discs in all of the strings may be identical. The strings may be of the same or different lengths.

Strings 36 and 40 are generally in respective parallel lines 54, 56 which are at an angle 55 which may be approximately 45°, with the directions 66 of shore line 20. The strings 34 and 38 are at an angle 53 with the shore line 20 directions 66. The angles 55 and 53 may be the same or different. In the present case these angles are the same. Thus the string pairs 38, 40; 36, 38; 34, 36 and so forth are at an angle 59, which may be 90°. The angles 55 and 53 may be at any desired value depending upon a given implementation, for example, in a range of about 15° to 75°. The angles 55, 53 are set with a number of factors in mind such as type of soil, wave severity, depth of soil to be protected, the breadth of the beach area to be protected, dimensions of the discs 42, 44 and so forth. These factors have complex relationships whose effects can be determined empirically.

Strings 36 and 40 are buried in the soil to a depth where they are completely covered. That portion of these strings extending over dune 18 follow the contour of dune 18. The tops of the discs of strings 36, 40 may be covered with soil to a depth of a few inches. String 34 overlies and crosses string 36 adjacent region 60 in portion 30. Disc 44 of strings 34 may overlie disc 44' of string 36. String 38 overlies string 36 in string region 62. Disc 62' of string 38 may overlie disc 62" of string 36 at region 62. String 38 also overlies burried string 40 in region 64 of portion 32, so that disc 64' is over disc 64". This arrangement of strings and their spaced overlying relationship continues along the beach in directions 66 including as many strings 34, 36, 38 and 40 as desired. The line of parallel strings are either buried or over the buried strings. The overlying strings may rest on top of the soil or may be set into the soil. While one group of strings is shown buried and the other on top of the soil, this is not essential. The crossing of the strings is also not essential. These latter arrangements are by way of example.

All of the strings 34, 36, 38, 40 are constructed similarly. Therefore the construction of disc 44 and its interconnecting links 52 will be described by way of example as representative of the construction of the remainder of the interconnected discs of retaining wall system 14. Disc 44, FIG. 7, is by way of example, a circular cylindrical body formed with diametrically opposite holes 68, 70 near edge 72.

Holes 68, 70 have the same diameter and pass through normal to the broad surfaces 77, 79 of the disc 44. The holes 68, 70 may, for example be formed of tubular material molded in place during the molding of disc 44. The disc 44 may be formed in a mold of the desired shape. Holes 68, 70 are parallel and may be spaced equally from the disc 44 circular edge 72. The disc broad surfaces 77, 79 are flat and parallel. By way of example, disc 44 may be 8 inches thick and 30 inches in diameter. When made of concrete, the disc may weigh about 400 pounds. This is sufficiently heavy to resist the forces of most expected water currents.

In FIGS. 3 and 5, link 52 comprises a rigid structure 73 and two pins 76, 78 (dashed lines) secured to the respective discs by cotter pins 98 (FIG. 6). Structure 73 may be formed from two mirror image members 80, 82. Member 82 is u shaped and may be a bent bar of flat steel. Member 80 has two parallel legs 84, 86 extending from the ends of base leg 88. Holes 90, 92 are in respective legs 84, 86 and aligned parallel to leg 88. Pin 76 is closely received in holes 90, 92 and can rotate in holes 90, 92 about axis 94 parallel to leg 88. Pin 78 can rotate about axis 95 which is normal to and spaced from axis 94, parallel to leg 88'. Member 82 is identical to member 80 with its base leg 88' welded or otherwise secured to leg 88. Member 82 legs 84', 86' are similar to legs 84, 86 and extend in the opposite direction as legs 84, 86. Base leg 88' has its length dimension normal to the length dimension of leg 88. This is best seen in FIG. 5. However, depending upon a particular implementation, legs 88, 88' can be at other angles as well.

In FIG. 6, a typical connection of a link 52 to adjacent discs, such as discs 42, 44 is illustrated in more detail. In this Figure only member 80 is shown for simplicity of explanation. Disc 42 is attached to a link 52 by pin 76 passing through holes 90, 92 (FIG. 3) in legs 84, 86, respectively, and hole 56 in disc 42. Two cotter pins 98 pass through corresponding mating holes in pin 76. One cotter pin 98 is adjacent leg 84 and the other adjacent leg 86 (only one being shown in FIG. 6). Pins 98 lock pin 76 to legs 84, 86. The disc 42 hole 56 closely receives pin 76 permitting the pin 76 to rotate about axis 94, FIG. 3, and permits negligible tilting of the pin 76 in hole 56. Legs 84, 86 straddle the disc 42 so that the disc 42 can only rotate about axis 94, FIG. 3, directions 99, with respect to link 52.

A clearance C is between the outer edge 100 of disc 42 and the inner surface 101 of leg 88 sufficient to permit link 52 to rotate in directions 99 with respect to disc 42 a desired angle determined by a given implementation. For example, in FIG. 8, the clearance C between surface 100 and leg 88 determines the angle 103 that disc 42 can rotate about pin 76 before disc 42 abuts leg 88 of link 52. That angle 103 is important for that determines in practice the angle at which one disc can rotate with respect to its adjoining links 52 and thus the magnitude one disc such as disc 42, can move in a direction parallel to its plane with respect to an adjoining disc. This will be explained more fully below. The angle 103 can be the same or different for the different discs, depending upon a given implementation determined by the erosion and expected settling and erosion characteristics of the terrain. Unless otherwise required, the angle 103 is generally uniform throughout the retaining wall system. By way of example, angle 103 may be about 15°–90°.

In FIG. 6, disc 44 is secured between legs 84', 86' by pin 78 passing through hole 68. Pin 78 is secured in place by cotter pins 98 through mating holes in pin 78. The clearance between the outer surface 77 of disc 44 and inner surface 102 of leg 88' is as discussed above in connection with disc 42 and surface 101. Thus each disc can swing with respect to an adjacent disc through angle 103, FIG. 8. This means disc 42 can swing by way of link 52 with respect to disc 44 through angle 103 (FIG. 8) about axis 95 in a plane normal to the drawing. Also disc 44 can swing about axis 94 in a plane parallel to the plane of the drawing FIG. 6, assuming the link 52 and disc 42 remaining fixed in place. Disc 44 can also move about axis 95. As a result, their relative motions permit the disc to follow the terrain during emplacement. It is also important that disc 42 does not twist with respect to disc 44. This could cause the disc to drop flat onto the soil rather than remain standing on edge. That is, it is not desirable that discs 42, 44 twist (rotate) about an axis normal to legs 88, 88' relative to each other. Therefore the link 52 members 80, 82 must be constructed sturdily to withstand the forces tending to induce such twisting.

As seen in FIG. 4 adjacent discs such as discs 46, 48 are in respective different intersecting planes 49, 51. In this case the planes 49, 51 are at right angles. These planes are determined by the orientation of pins 76, 78 in link 52, as best seen in FIG. 5. Alternate discs such as discs 42, 46; or 44, 48, and so forth lie generally in the same plane such as planes 49, 51 respectively. However, this relative relationship of the discs may change somewhat as one or more discs settle in response to soil erosion beneath the system or a portion of it. In FIG. 1, the discs of strings 34, 38 are set on edge such that lower edges 110, 112 rest on the soil. The buried discs of strings 36, 40 are oriented similarly to the discs of strings 34, 38, FIG. 4, as shown by representative discs 46, 48.

The discs of upper strings 34, 38 may be partially or entirely buried. When partially buried a relatively large surface area of a disc is adjacent the soil surface and faces oncoming waves and back-flow currents. The lines 54–57 of the different strings are all at an angle to the direction 19 of oncoming waves, and the discs of upper strings 34, 38 tend to break up the waves. This is because in direction 19 along the length of shore line 20 a wave, if it proceeds sufficiently far over the beach, will reach one of the upper strings 34, 38, these strings overlapping in direction 19. For example, the end disc 121 of string 38 can overlap the first disc 42 in string 34 closest to shore line 20 in direction 19 along dashed line 123. These upper discs also tend to minimize soil erosion by limiting back-flow to areas between the discs and between adjacent upper strings 34, 38 in direction 120. The flow of water in direction 120 tends to be dammed by strings 36, 40 as the soil between strings 34, 36 is eroded exposing the lower strings 36, 40 to the flow slowing down the flow in direction 120. This action tends to slow the back-flow currents toward water 10 an amount sufficient to allow the suspended soil in the back-flow to settle prior to being washed away.

In the event soil erosion occurs beneath one or more discs different effects can take place depending upon the location in the string that is being undermined and how many adjacent discs are undermined. Assume a single disc 48 string 34 is undermined, i.e., soil is eroded beneath that disc. Disc 48 has a string of discs 42, 44, 46 on one side and the remaining of the string 34 on the other side. Assume in FIG. 4 that soil 126 (above dashed line 128) is eroded only beneath disc 48. Disc 48 would tend to rotate due to its weight about an axis parallel to the ground normal to the drawing sheet at links 52 in direction 130. But as explained above, link 52 does not readily permit such rotation. Thus disc 48 would remain suspended by links 52.

Another possible motion is movement of disc 48 with respect to adjacent discs 46, 50 FIG. 2, about an axis such as axis 95, FIG. 6, through one of the pins 78. This movement would tend to be in direction 132, in the plane 51 of disc 48, FIG. 4. Disc 48 would want to rotate with respect to both links 52 at opposite edges of disc 48. However, that movement in direction 132, FIG. 4, does not take place as the disc 44 is pinned at opposite sides. That movement would tend to foreshorten the distance between pins 76, 78 of links 52 securing disc 48 in place. The foreshortening does not occur here as the weight of disc 48 is insufficient to drag the discs of the rest of that string via pins 76, 78 in an attempt at that foreshortening action. That is, in order for disc 48 to drop in direction 132, FIG. 4, with respect to the remaining discs, the space between the adjacent discs 60 would tend to be shortened along the string line 55, FIG. 2. As a result, disc 48 would tend to drag the adjacent discs toward it. The combined weight of discs 42, 44 and 46 on one side of disc 48 and the discs 50 and so forth on the other side is such that the pull by disc 48 in a direction along line 55 as disc 48 tends to drop is insufficient to drag the discs on either side of disc 48. The result is that disc 48 tends to remain in place, suspended above the ground by adjacent discs 46, 50. The links 52 maintain the integrity of a string during this action and the string behaves somewhat as a rigid wall.

The suspension of a disc is desirable as this tends to maintain the central portion of the line of the string 34 above ground and alleviates erosion action over that disc in response to back-flow. If disc 48 were to sink below the level of adjoining discs, then back-flow would tend to wash over the sunken disc and erosion would tend to increase in intensity.

If a series of discs such as discs 46, 48, 50 were to be undermined with erosion therebeneath such as to the dashed line 128, FIG. 4, then in this case the string of discs 46, 48, 50 would tend to sink due their combined weight dragging end discs 42, 44 in a manner to close the foreshortened space between the adjacent discs 44, 50', FIG. 2. Also the combined weight of discs 46, 50 could tend to rotate the end string of discs 42, 44 about an axis parallel to the line 55 due to the vertical dropping of discs 46–50 with respect to that axis and due to the possible misalignment of their combined mass with respect to that axis creating a rotating torque on discs 42, 44. In any case, due to the pinned relationship of the discs to links 52, there is some flexibility in a string which would permit movement of a large portion of the string with respect to the remaining portion depending on the forces involved.

An important feature is when the strings tend to be undermined at their ends near portions 30, 32 at end regions 60, 64, FIG. 2. The end disc 42, because it is pinned only at one edge, is free to drop should erosion occur beneath it. This dropping would permit disc 44 to drop, and thus the next disc 46 and so forth. Since it is believed significant erosion occurs closest to shore line 20, the relative flexibility of the ends of a string is important to respond to that erosion. This action would tend to alleviate stress on the system which stress would occur with a central disc suspended between adjacent discs. Thus the sinking action of the string ends tends to maintain the system integrity by alleviating stress in the system.

However, even the sinking of the string 34 end at 60 can be postponed by the overlapped relation to string 36. Thus even if discs 42, 44, 46 were undermined by erosion, the underlying discs of buried string 36 are not undermined due to their deeper position below the erosion level. The lower string 36 tends to hold up the upper string 34 in region 60. The pinned connection of links 52 to the discs tends to permit the overlying discs to drape, that is, move with respect to each other so that the discs 42, 44, 46 remain supported by underlying disc structure or soil. The pinned connections would permit the string 34 end at region 60 to possibly displace from line 55. The draping orientation could be somewhat similar to the relative orientation of the discs over dune 18, FIG. 1.

Even if erosion were to occur so as to lower the strings 34, 38, the lower elevation of buried strings 36, 40 tends to lengthen the time duration in which the eroding back-flow currents in direction 16 are confronted with non-undermined discs. Since back-flow would tend to increase as the erosion becomes severe in which more open space beneath and around discs becomes available for the currents to reach shore line 20, the buried discs tend to slow the erosion even if increased erosion occurs around strings 34, 38.

The overlapped angular relation of the strings 34, 36, 38, 40 at angles 55, 53 and 59 is important as it presents a continuous retaining wall system in directions 66 to back-flow currents in direction 16, FIGS. 1 and 2. The number, size, shape, spacing and so forth of the discs can be different from that shown in accordance with a given implementation. For example, the discs could be straight sided polygons and the angular relationships may be different than the right angle described between the planes 49, 51 of adjacent discs.

To install the system 14 the discs are pinned to links 52 insitu. The pinned relationship permits adjacent discs to be at different levels, for example, to overlap sand dunes, such as dune 18, FIGS. 1 and 2, during installation. Thus system 14 can be installed over relatively rough terrain and yet remains a flexible, but integral system, capable of withstanding severe erosion conditions.

What is claimed is:

1. A retaining wall system for minimizing soil and sand erosion comprising:

a plurality of first elements each having first and second spaced apart surfaces relative to a center plane thereof;

at least one second element having first and second spaced apart surfaces relative to a center plane thereof; and connector means for connecting said first and second elements into a string so that said first elements are interposed with said at least one second element and adjacent first and second elements are spaced from each other, with adjacent first and second elements having their center planes disposed transversely relative to each other and so that, when said string is placed on a flat surface, the first spaced apart surface of one of said first elements is at an angle acute to said flat surface and the second spaced apart surface of said one of said first elements is at an angle obtuse to said flat surface, while the first spaced apart surface of said adjacent at least one second element is at an angle obtuse to said flat surface and the second spaced apart surface of said at least one second element is at an angle acute to said flat surface, wherein said connector means comprises a plurality of link devices each including a first member configured to be pivotally secured to one of said first or second elements, and a second member configured to be pivotally secured to an adjacent said element, said first member and the associated said second member of each of said link devices being fixedly secured together.

2. A retaining wall system in accordance with claim 1, wherein each of said first members and each of said second members pivot about associated pivot axes which are substantially perpendicular to said center planes of the associated said first and second elements.

3. A retaining wall system in accordance with claim 2, wherein said pivot axes associated with adjacent said first elements and second elements are disposed transversely to each other.

4. A retaining wall system in accordance with claim 1, wherein said first members and said second members are each substantially U-shaped and each include substantially parallel spaced apart portions connected by an intermediate portion, said intermediate portions of said first and said second members associated together in each of said link devices being fixedly secured together.

5. A retaining wall system in accordance with claim 3, wherein said substantially parallel spaced apart portions of each of said first members individually and each of said second members individually have disposed therethrough a pair of aligned apertures, said link devices each further comprising a bearing pin for disposition in and retention in the aligned apertures of said first member thereof and a bearing pin for disposition in and retention in the aligned apertures of said second member thereof, each of said first and second elements having apertures disposed therethrough to accommodate therein said bearing pins of associated said link devices.

6. A retaining wall system in accordance with claim 5, wherein said apertures disposed through each of said first elements and said apertures disposed through each of said second elements are substantially perpendicular to said center plane of the associated said elements.

7. A retaining wall system in accordance with claim 6, wherein said first and said second spaced apart surfaces of each of said elements of said first elements and said second elements are substantially parallel to each other and said center plane thereof.

8. A retaining wall system in accordance with claim 6, wherein said substantially parallel spaced apart portions of each of said first members and each of said second members are sized so as to closely receive therein a selected portion of an associated said element of said first elements and said second elements so as to maintain said center planes of adjacent said elements in a constant angular relationship regardless of said pivoting of said elements about said pivot axes.

9. A retaining wall system in accordance with claim 8, wherein said apertures disposed through each of said elements of said first elements and said apertures disposed through each of said elements of said second elements are positioned so as to permit said pivoting only through a preselected angle.

10. A retaining wall system in accordance with claim 9, wherein said first or second elements at the ends of said string have only one of said connector means associated therewith.

11. A retaining wall system in accordance with claim 9, wherein said first elements and said second elements alternate in said string.

12. A retaining wall system in accordance with claim 11, wherein said center planes of adjacent said first and second elements are at right angles to each other.

13. A retaining wall system for minimizing soil and sand erosion comprising:

a plurality of first substantially planar elements each having first and second spaced apart surfaces relative to a center plane thereof;

a plurality of second substantially planar elements having first and second spaced apart surfaces relative to a center plane thereof; and connector means for connecting said first and second elements into a string so that said first elements are interposed with said second elements and adjacent first and second elements are spaced from each other, with adjacent first and second elements having their center planes disposed transversely relative to each other and so that, when said string is placed on a flat surface, the first spaced apart surface of one of said first elements is at an angle acute to said flat surface and the second spaced apart surface of said one of said first elements is at an angle obtuse to said flat surface, while the first spaced apart surface of said adjacent one of said second elements is at an angle obtuse to said flat surface and the second spaced apart surface of said one of said second elements is at an angle acute to said flat surface, whereby a fluid can flow in a first direction across said substantially planar surface of said first spaced apart surface of said second elements, and said fluid can flow in a second direction opposite to said first direction between said adjacent first and second elements.

14. A retaining wall system in accordance with claim 13, wherein said first elements and said second elements are substantially disc shaped.

15. A retaining wall system in accordance with claim 13, wherein said first elements and said second elements are constructed of concrete.

16. A retaining wall system in accordance with claim 13, wherein said adjacent said elements of said first elements and said second elements are disposed so as to have their center planes substantially at right angles relative to each other.

17. A retaining wall system in accordance with claim 13, wherein said elements of said first elements and said second elements are solid.

18. A retaining wall system in accordance with claim 13, comprising a plurality of said strings.

19. A retaining wall system in accordance with claim 18, wherein said strings are disposed at right angles relative to each other.

20. A retaining wall system in accordance with claim 41, wherein said strings overlie each other at selected locations.

21. A method for minimizing sand and soil erosion on beaches adjacent to a body of water comprising the steps of:
providing a plurality of first substantially planar elements each having first and second spaced apart surfaces relative to a center plane thereof;
providing a plurality of second elements each having first and second spaced apart surfaces relative to a center plane; and
connecting said elements to form a string so that said first elements are interposed with said second elements and adjacent first and second elements are spaced from each other, with adjacent first elements and second elements having their center planes disposed transversely relative to each other and so that, when said string is placed on a flat surface, the first spaced apart surface of one of said first elements is at an angle acute to said flat surface and the second spaced apart surface of said one of said first elements is at an angle obtuse to said flat surface, while the first spaced apart surface of said adjacent one of said second elements is at an angle obtuse to said flat surface and the second spaced apart surface of said one of said second elements is at an angle acute to said flat surface, whereby a fluid can flow in a first direction across said substantially planar surface of said first spaced apart surface of said second elements, and said fluid can flow in a second direction opposite to said first direction between said adjacent first and second elements.

22. A method in accordance with claim 21, wherein said first elements and said second elements are connected in an alternating relationship.

23. A method in accordance with claim 21, wherein each of said first elements and each of said second elements comprise a disc shaped member.

24. A method in accordance with claim 21, further comprising the step of burying selected ones of said first elements and said second elements.

25. A method in accordance with claim 21, wherein said adjacent said first and second elements are disposed so as to have their center planes substantially at right angles relative to each other.

26. A method for minimizing sand and soil erosion on beaches adjacent to a body of water comprising the steps of:
providing a plurality of first elements each having first and second spaced apart surfaces relative to a center plane thereof;
providing at least one second element having first and second spaced apart surfaces relative to a center plane; and
connecting said elements to form a string so that said first elements are interposed with said second elements and adjacent first and second elements are spaced from each other, with adjacent first and second elements having their center planes disposed transversely relative to each other and so that, when said string is placed on a flat surface, the first spaced apart surface of one of said first elements is at an angle acute to said flat surface and the second spaced apart surface of one of said first elements is at an angle obtuse to said flat surface, while the first spaced apart surface of said adjacent at lease one said element is at an angle obtuse to said flat surface and the second spaced apart surface of said at least one second element is at an angle acute to said flat surface, wherein said connecting is accomplished by a plurality of link devices each including a first member configured to be pivotally secured to one of said first or second elements, and a second member configured to be pivotally secured to an adjacent said element, said first member and the associated said second member of each of said link devices being fixedly secured together.

27. A method in accordance with claim 26, wherein said first members and said second members are each substantially U-shaped and each include substantially parallel spaced apart portions connected by an intermediate portion, said intermediate portions of said first and said second members associated together in each of said link devices being fixedly secured together.

28. A method in accordance with claim 27, wherein said substantially parallel spaced apart portions of each of said first members individually and each of said second members individually have disposed therethrough a pair of aligned apertures, said link devices each further comprising a bearing pin for disposition in and retention in the aligned apertures of said first member thereof and a bearing pin for disposition in and retention in the aligned apertures of said second member thereof, each of said first and second elements having apertures disposed therethrough to accommodate therein said bearing pins of associated said link devices.

29. A method in accordance with claim 28, wherein said apertures disposed through each of said elements and said apertures disposed through each of said second elements are substantially perpendicular to said center plane of the associated said elements.

30. A method in accordance with claim 29, wherein said substantially parallel spaced apart portions of each of said first members and each of said second members are sized so as to closely receive therein a selected portion of an associated said element of said first plurality of elements and said second plurality of elements so as to maintain said center planes of adjacent said elements in a constant angular relationship regardless of said pivoting of said elements about said pivot axes.

31. A method in accordance with claim 30, wherein said apertures disposed through each of said elements of said first plurality of elements and said apertures disposed through each of said elements of said second plurality of elements are positioned so as to permit said pivoting only through a preselected angle.

* * * * *